United States Patent [19]
Hirokawa

[11] Patent Number: 5,640,248
[45] Date of Patent: Jun. 17, 1997

[54] FACSIMILE APPARATUS FOR COMPRESSING AND STORING PROGRAM RELATED TO MAINTENANCE FUNCTION

[75] Inventor: Masashi Hirokawa, Atsugi, Japan

[73] Assignee: Ricoh Company, Ltd., Tokyo, Japan

[21] Appl. No.: 530,582

[22] Filed: Sep. 19, 1995

[30] Foreign Application Priority Data

Sep. 30, 1994 [JP] Japan .................. 6-250731

[51] Int. Cl.$^6$ ........................................ H04N 1/00
[52] U.S. Cl. ........................................ 358/406
[58] Field of Search ........................ 358/406, 468, 358/444; 395/182.14, 183.14; 364/267

[56] References Cited

U.S. PATENT DOCUMENTS

| | | | |
|---|---|---|---|
| 3,751,582 | 8/1973 | Wernikoff et al. | 358/406 |
| 4,631,598 | 12/1986 | Burkhardt et al. | 358/425 |
| 5,253,360 | 10/1993 | Hayashi | 395/182.14 |
| 5,530,847 | 6/1996 | Schieve et al. | 395/183.14 |

*Primary Examiner*—Scott A. Rogers
*Attorney, Agent, or Firm*—Oblon, Spivak, McClelland, Maier & Neustadt, P.C.

[57] ABSTRACT

A facsimile apparatus uses a small capacity memory for storing program data used for a maintenance function by compressing the program data. The facsimile apparatus stores maintenance programs used for maintenance service functions, one of the maintenance programs being selected according to a request made by a user so as to perform a maintenance service function in accordance with the selected maintenance program. The program data is stored as one of a non-compressed program data and a compressed program data. The program data which corresponds to at least one of the maintenance programs is stored as the compressed program data. The compressed program data which corresponds to the selected one of the maintenance programs is read out and restored. The maintenance program which is restored from the compressed program data is executed.

4 Claims, 8 Drawing Sheets

FACSIMILE APPARATUS FOR COMPRESSING AND STORING PROGRAM RELATED TO MAINTENANCE FUNCTION

BACKGROUND OF THE INVENTION

1) Field of the Invention

The present invention generally relates to a facsimile apparatus and, more particularly, to a facsimile apparatus which has a memory for storing maintenance program data and parameter data individually set for each apparatus.

2) Description of the Related Art

Generally, a facsimile apparatus has a system controlling means including a microprocessor which can provide a maintenance function or an initializing function other than a facsimile communication function. For example, the maintenance function is used for a maintenance operation performed by a maintenance person when a malfunction which cannot be handled by a user has occurred. The initializing function is used for registering individual information for each facsimile apparatus when the facsimile apparatus is initially installed. The initializing function includes registration of shortened dial information operations performed by a user.

Recently, since the facsimile apparatus has become multi-functioned, operations for the above-mentioned maintenance function and initializing function have increased. Accordingly, the amount of data for a program used by the system controlling means has increased. In order to store the large amount of data for the program, a large capacity is required for a memory, for example a read only memory (ROM). Accordingly, there is a problem in that manufacturing cost for the entire facsimile apparatus has increased.

Additionally, parameter information which is specific for each facsimile apparatus is normally stored in a statistic random access memory (SRAM) which is backed-up by a battery. The contents in the SRAM can be unintentionally changed due to noise introduced into the SRAM. Accordingly, there is a problem in that an error can occur in operation of the facsimile apparatus.

SUMMARY OF THE INVENTION

It is a general object of the present invention to provide an improved and useful facsimile apparatus in which the above-mentioned problems are eliminated.

A more specific object of the present invention is to provide a facsimile apparatus which has a small capacity memory for storing program data used for a maintenance function by compressing the program data.

Another object of the present invention is to provide a facsimile apparatus which stores parameter information, which is normally stored in an SRAM, in a non-volatile memory provided in the facsimile apparatus so as to recover the parameter information if it is lost.

In order to achieve the above-mentioned objects, there is provided according to the present invention a facsimile apparatus having maintenance programs stored therein and used for maintenance service functions, one of the maintenance programs being selected according to a request made by a user so as to perform a maintenance service function in accordance with the selected maintenance program, the facsimile apparatus comprising:

selecting means for selecting one of the maintenance programs corresponding to a maintenance service function requested by the user;

storing means for storing program data as one of non-compressed program data and compressed program data, the program data corresponding to at least one of the maintenance programs stored as the compressed program data;

reading means for reading the compressed program data which corresponds to the selected one of the maintenance programs from the storing means;

restoring means for restoring the compressed program data read by the reading means; and executing means for executing the maintenance program restored from the compressed program data read by the reading means.

In one embodiment of the present invention, the storing means comprises a non-compressed program area, a compressed program area and a parameter data area, the non-compressed program area storing the program data which is not compressed, the compressed program area storing the program data which is compressed, the parameter data area storing parameter data used in the maintenance service functions of the facsimile apparatus, and the storing means being divided into a plurality of data blocks having a predetermined data size, each of the data blocks being rewritable separately. The storing means is a non-volatile semiconductor memory, preferably, a flash read only memory.

The facsimile apparatus according to the present invention may further comprise memory means for storing the same parameter data as that stored in the parameter data area of the storing means, and wherein the parameter data area of the storing means is overwritten, when the parameter data stored in the memory means is updated, by the updated parameter data and, the memory means is overwritten, when the facsimile apparatus is turned on, by the parameter data stored in the parameter data area of the storing means. The memory means is preferably a statistic random access memory.

Additionally, the storing means further comprises a received and compressed data area which stores the compressed program data corresponding to the maintenance programs. The compressed program data is received from a remote apparatus via a facsimile communication line, and the reading means reads the compressed program data which corresponds to the selected one of the maintenance programs from the received and compressed program area of the storing means.

According to the present invention, the program data which is not frequently used is stored in a compressed state, and the compressed program data is restored if it is necessary. This permits a reduction in the capacity of the memory means provided in the facsimile apparatus, which results in a great reduction in manufacturing cost of the facsimile apparatus.

Additionally, when a malfunctioning occurs in the facsimile apparatus, a patch program can be transmitted from a remote location (service center) to the facsimile apparatus via the facsimile communication line. The patch program is stored in the storing means, and is used to tentatively operate the facsimile apparatus if the malfunctioning can be avoided by using the patch program. Accordingly, the facsimile apparatus can be operated, possibly with limited functions, until a maintenance person arrives and finally fix the facsimile apparatus.

Other objects, features and advantages of the present invention will become more apparent from the following detailed description when read in conjunction with the accompanying drawings.

DETAILED DESCRIPTION OF THE PREFERRED EMBODIMENTS

Figure 1:
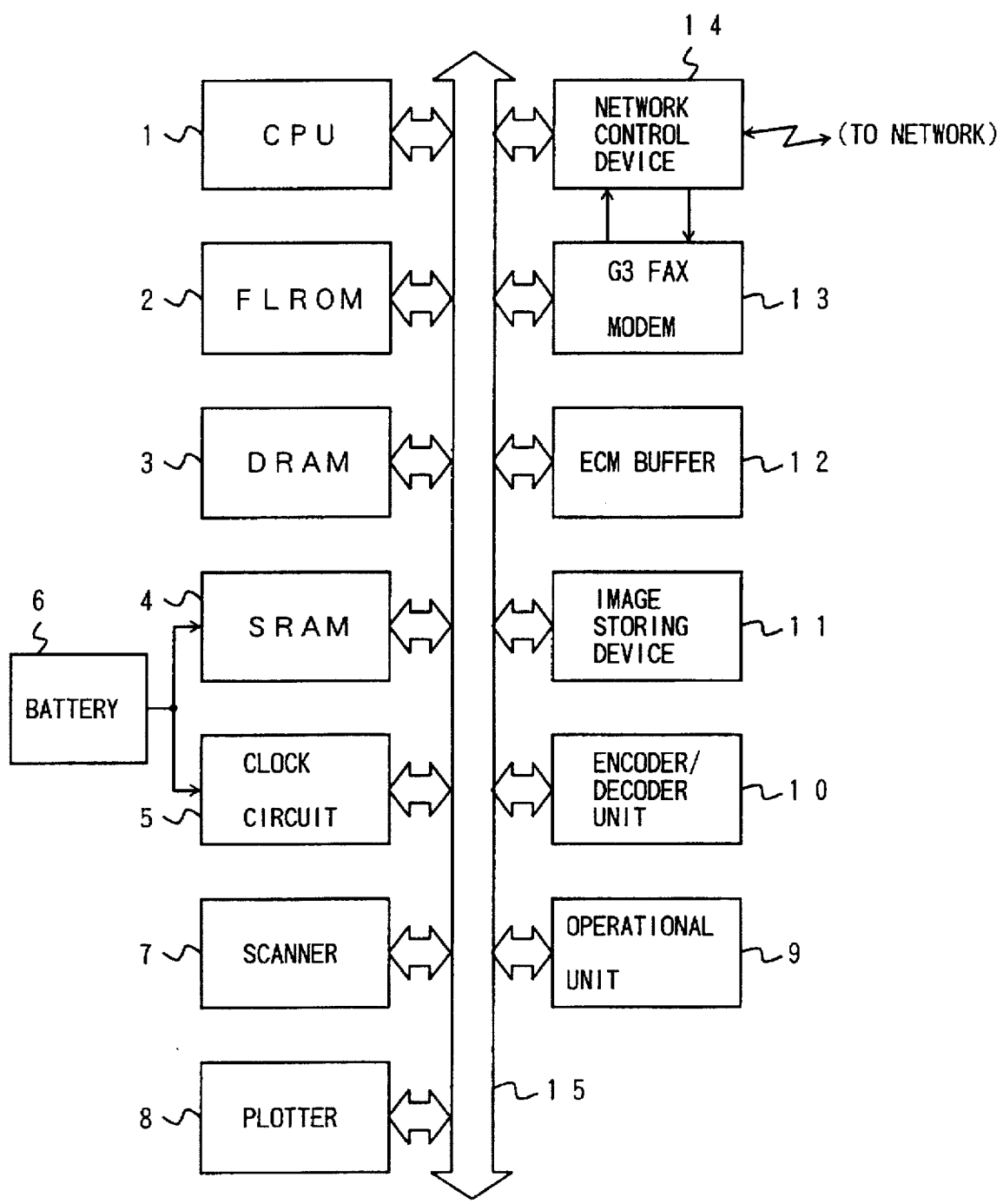
FIG. 1 is a block diagram of a group 3 facsimile apparatus according to a first embodiment of the present invention.

A description will now be given of a first embodiment of the present invention. FIG. 1 is a block diagram of a group 3 facsimile apparatus according to the first embodiment of the present invention.

In FIG. 1, A central processing unit (CPU) 1 controls each part of the facsimile apparatus. The CPU 1 also control a facsimile transmission according to a facsimile communication protocol. A flash ROM (FLROM) 2 stores a control program used by the CPU and various sets of data used for executing the control program. A dynamic RAM (DRAM) 3 provides a work area for the CPU 1. A SRAM 4 stores information for various parameters which are specific for this particular facsimile apparatus. A clock circuit 5 outputs time information. The SRAM 4 and the timer circuit 5 are backed-up by a battery 6.

A scanner 7 scans an original image at a predetermined resolution. A plotter 8 prints an image at a predetermined resolution. An operational unit 9 comprises an operational key-pads and various display units so that a user inputs instruction to the facsimile apparatus and receives information from the facsimile apparatus.

A encoder/decoder unit 10 encodes and compresses image signals and decodes and enlarges the image signals. An image storing device 11 stores many sets of image information which are encoded and compressed. An ECM (error correction mode) buffer 12 temporarily store communication data when the communication data is transmitted or received in an error correction mode.

A group 3 facsimile modem 13 is provided for performing a modem function of the group 3 facsimile. The group 3 facsimile modem comprises a low speed modem function (V.21 modem) and a high speed modem function (V.33 modem, V.29 modem, V.27 ter modem, etc.). The low speed modem function is provided for communication protocol, and the high speed modem function is mainly for communication of image information.

A network control device 14 connects the facsimile apparatus to the public telephone network. The network control device has an automatic calling and receiving functions.

Each of the above-mentioned component parts of the facsimile apparatus are connected to a system bus 15 so that data communication between the component units is performed through the system bus 15. Additionally, communication between the network control device 14 and the G3 facsimile modem 13 is performed directly.

Figure 2A:
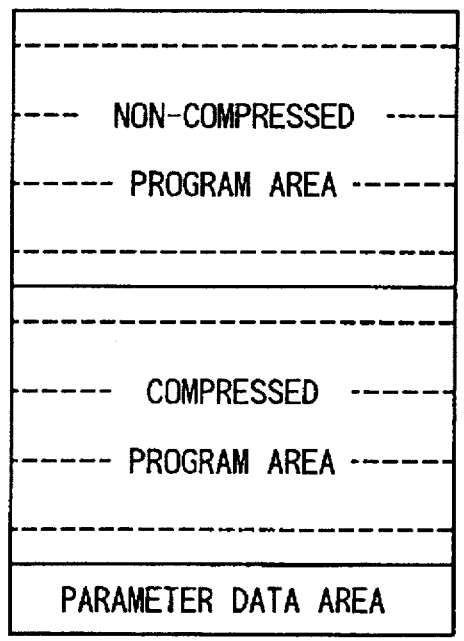
FIG. 2A is an illustration of a structure of a flash ROM shown in FIG. 1.

In the above-mentioned facsimile apparatus, the FLROM 2 has an over-write function in which data stored therein is overwritten block by block, each block having a predetermined data size. A memory area of the FLROM 2 is divided into, as shown in FIG. 2A, a non-compressed program area, a compressed program area and a parameter data area. A predetermined number of blocks are assigned to the non-compressed program area and the compressed program area. A single block is assigned to the parameter data area. If the FLROM 2 is divided into a plurality of data blocks having different data sizes, a data block having a larger data size may be assigned to the non-compressed program area and a compressed program area and a data block having a smaller data size may be assigned to the parameter data area.

The non-compressed program area mainly stores program data of sets of programs for performing a group 3 facsimile communication in a non-compressed state. The compressed program area stores program data for achieving a maintenance function and an initializing function in a compressed state by a predetermined data compression method. It should be noted that an appropriate conventional data compression method can be used as the predetermined data compression method used in this embodiment.

Accordingly, the CPU 1 can directly execute a program corresponding to the program data stored in the non-compressed program area. Hereinafter, the program data which can be directly executed is referred to as direct execute program data. On the other hand, a program corresponding to the program data stored in the compressed program area cannot be directly executed until the program data is restored.

Figure 2B:
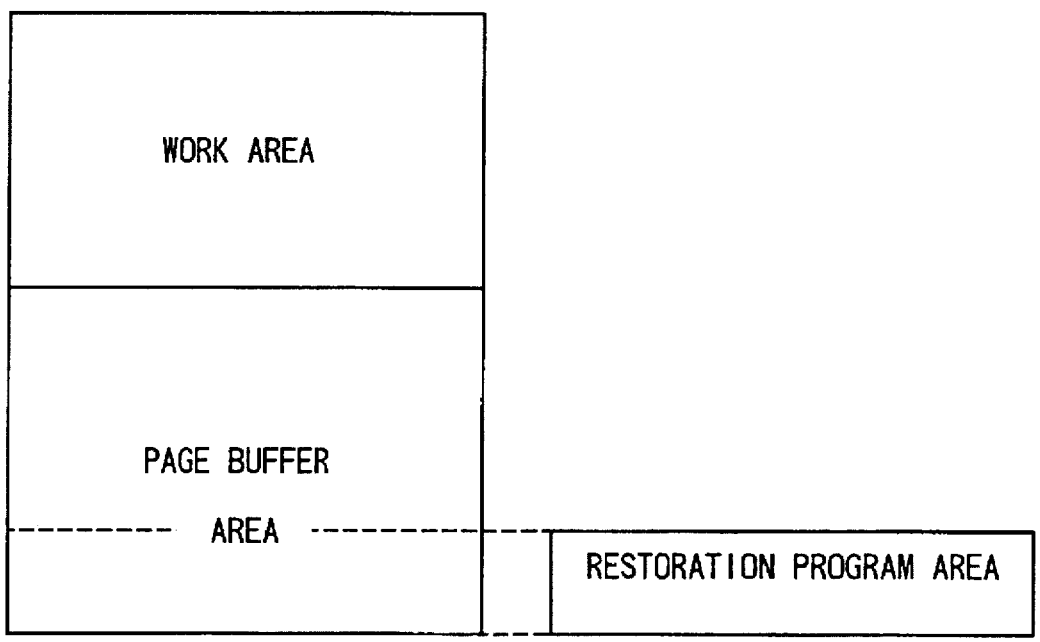
FIG. 2B is an illustration of a structure of a dynamic RAM shown in FIG. 1.

In this embodiment, as shown in FIG. 2B, a restoration program area is provided in a page buffer area of the DRAM 3. When a program corresponding to the compressed program data is executed, the compressed program data is read in a work area of the DRAM 3. The compressed program data is restored in a form of the direct execute program data by using a predetermined data restoring method. The direct execute program data is stored in the restoration program area so that the direct execute program data is executed in the restoration program area.

As mentioned above, the memory area of the DRAM 3 is divided into the work area and the page buffer area. The work area is used by the CPU. The page buffer area temporarily stores image data. The restoration program area is provided within the page buffer area. The direct execute program data stored in the restoration program area is related to program data for performing the maintenance function and the initializing function. Accordingly, when a program corresponding to the direct execute program data is executed, the page buffer area excluding the restoration program area is not used. Additionally, the direct execute program data stored in the restoration program area is not erroneously executed when a facsimile communication is performed. The data size of the restoration program area is set to be a data size which corresponds to the maximum size of the direct execute program data to be stored in the restoration program area.

In the above-mentioned structure, the CPU 1 controls a regular facsimile communication function to send image data to a remote facsimile apparatus and to receive image data from a remote facsimile apparatus through the public telephone network.

Figure 3:
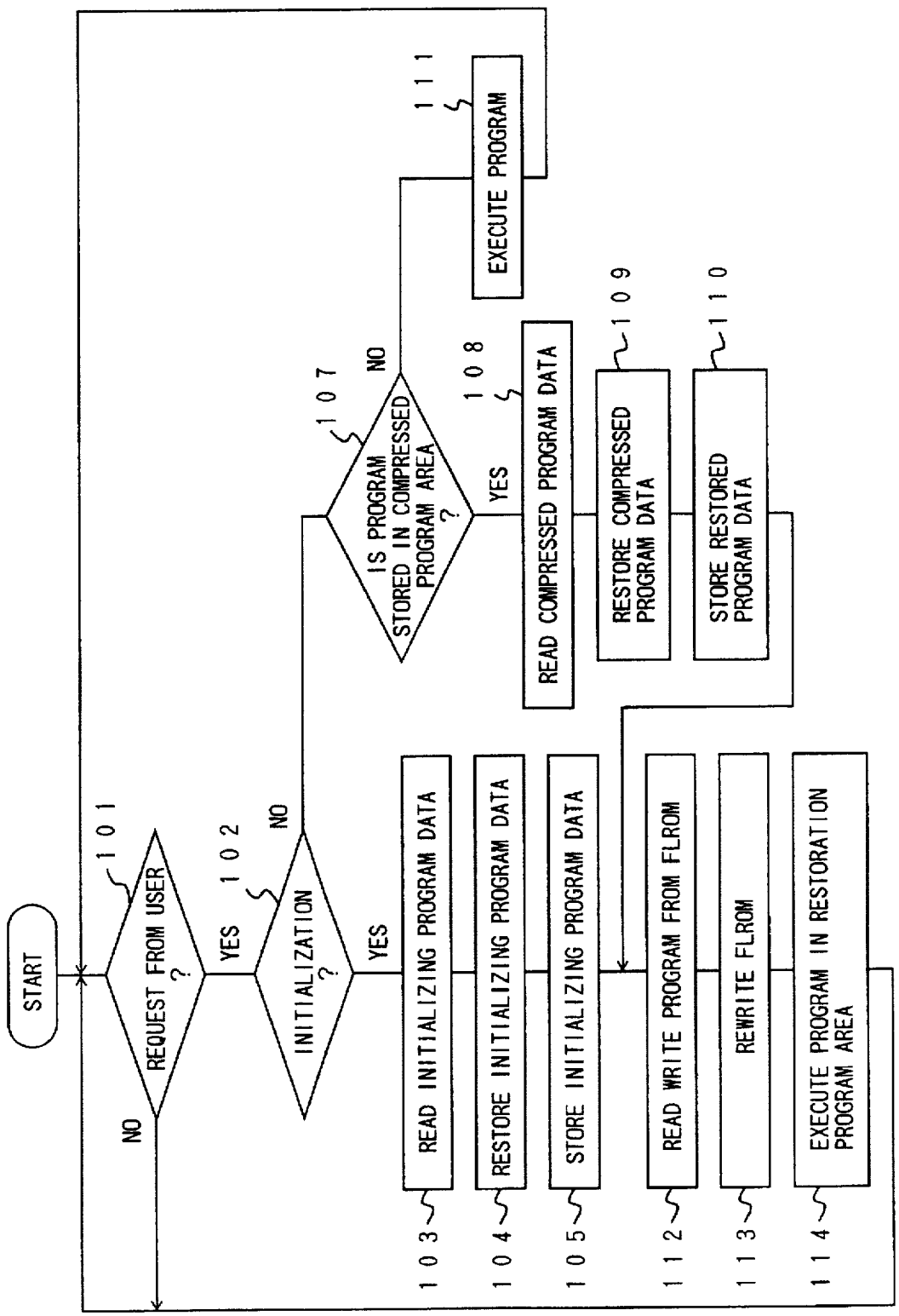
FIG. 3 is a flowchart of an operation for various service functions performed in the facsimile apparatus shown in FIG. 1.

Additionally, the CPU 1 controls various functions other than the facsimile communication function when a request is made by a user to perform various service functions including the initialization function. FIG. 3 is a flowchart of an operation of the various service functions performed in the present embodiment.

When the operation is started, the CPU 1 determines, in step 101 (hereinafter step is abbreviated as S), whether or not a request for the service functions is made by a user. If it is determined that a request is made, it is determined, in S102, whether or not the request is for the initializing function.

If the determination in S102 is affirmative, the compressed program data corresponding to an initialization program is read out, in S103, from the compressed program area of the FLROM 2. Then, the compressed program data is restored, by a predetermined restoring method in S104, to an original form which is the direct execute program data. The restored program data is then stored, in S105, in the restoration program area of the DRAM 3.

After the restored program data is stored in the restoration program area of the DRAM 3, compressed program data corresponding to a write program used for rewriting the FLROM 2 is read out, in S112, from the FLROM 2 and restored to the original form. Then, the FLROM 2 is rewritten, in S113, in accordance with the restored write program.

The CPU 1 executes, in S114, the program corresponding to the restored program data in the restoration program area, and then the routine returns to S101.

On the other hand, if it is determined, in S102, that the request is not for the initialization, the routine proceeds to S107. In S107, it is determined whether or not the request is related to one of the service functions of which program data are stored in the compressed program area of the FLROM 2.

If the determination in S107 is affirmative, the routine proceeds to S108 in which the program data corresponding to the requested service function is read from the FLROM 2. The compressed program data is stored in the work area of the DRAM 3. A predetermined restoration process is applied, in S109, to the program data in the compressed program data so as to restore the compressed program data to the original form. The restored program data is sequentially stored, in S110, in the restoration program area of the DRAM 3 starting from a first address.

After the direct execute program data is stored in the restoration program area in the above mentioned manner, the routine proceeds to S112 so as to rewrite the FLROM 2 and to execute the operation in accordance with the direct execute program data stored in the restoration program area.

If the determination in S107 is negative, the requested service function of which program data is stored in the non-compressed program area is read, and the program corresponding to the program data is executed without restoring the program data since the program data is not compressed.

Figure 4:
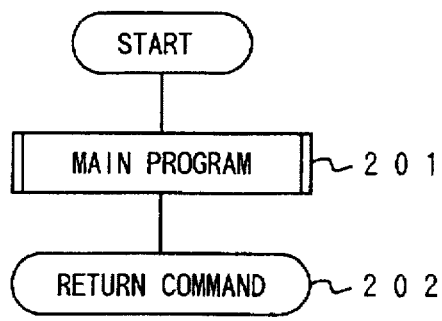
FIG. 4 is an illustration of a structure of a program stored in a compressed program area of the flash ROM shown in FIG. 1.

An operation executed according to the direct execute program data, which are restored from the program data in the compressed program area of the FLROM 2 has a structure shown in FIG. 4. That is, the direct execute program comprises a main program 201 and a return command 202. The main program 201 provides an operation for a service function. The return command 202 returns the control operation of the CPU 1 to the step 101 shown in FIG. 3. Accordingly, in this case, the step 114 is performed by a jump command which controls the CPU 1 to direct the address brought by the CPU 1 to the first address in the restoration program area of the DRAM 3.

When the initializing function or other service functions which are requested by a user are performed, the parameter data stored in the SRAM 4 is updated. At this time, the CPU 1 performs the operation shown in FIG. 5.

Figure 5:
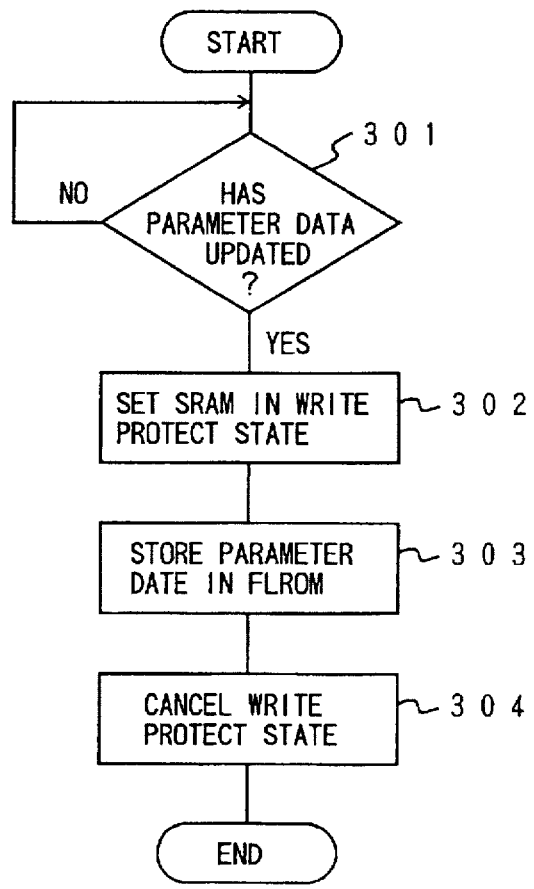
FIG. 5 is a flowchart of an operation for updating parameter data in the SRAM shown in FIG. 1.

When the operation shown in FIG. 5 is started, it is determined, in S301, whether or not the parameter data in the SRAM 4 has been updated. If it is determined that the parameter data has been updated, the SRAM 4 is set, in S302, in a write protect state in which the data in the SRAM 4 cannot be changed. The parameter data in the SRAM 4 is then stored in the FLROM 2 in S303. After the current parameter data is stored in the FLROM 2, the write protect state of the SRAM 4 is canceled, and the routine is ended.

The parameter data stored in the FLROM 2 is transferred to the SRAM when, for example, the facsimile apparatus is restarted after a short power failure or when a request is made to change the parameter data in the SRAM 4 to the back up data in the FLROM 2. In this manner, if the parameter data in the SRAM 4 is unintentionally changed due to noise, for example, the contents of the SRAM 4 can be restored. Thus, there is no need for the user to register the parameter data which is convenient for the user of the facsimile apparatus.

Additionally, in the present embodiment, the program data which is not frequently used is stored in a compressed state, and the compressed program data is restored if it is necessary. This permits a reduction in memory capacity of the FLROM 2, resulting in a great reduction of manufacturing cost of the facsimile apparatus.

A description will now be given of a second embodiment according to the present invention. The structure of the facsimile apparatus according to the second embodiment is the same as that of the facsimile apparatus according to the first embodiment.

When a serious malfunctioning has occurred in the facsimile apparatus, the user of the facsimile apparatus calls a maintenance person to fix the facsimile apparatus. However, there is a possibility that an alternative function can be used to temporarily operate the facsimile apparatus until the facsimile apparatus is fixed. In such a case, a patch program is sent from a service center to the facsimile apparatus. The patch program is temporarily stored in the FLROM 2. The user can tentatively use the facsimile apparatus by the patch program until a maintenance person arrives.

Figure 6A:
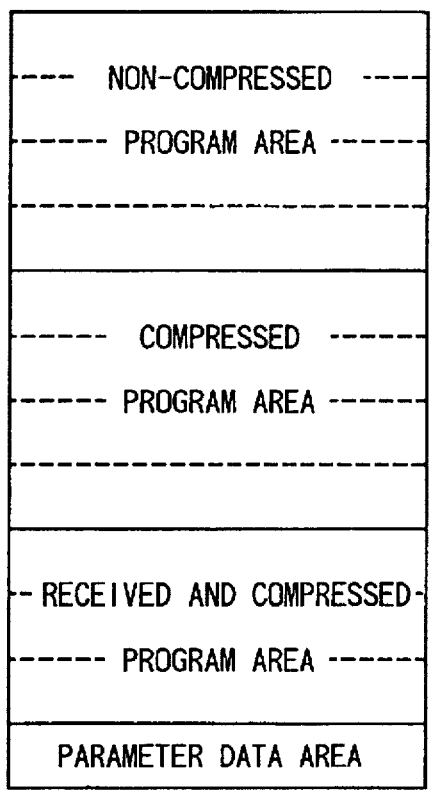
FIG. 6A is an illustration of a structure of a flash ROM of a second embodiment according to the present invention.

In the second embodiment, the memory area of the FLROM 2 is divided into the non-compressed program area, the compressed program area, a received and compressed program area and the parameter data area as shown in FIG. 6A. A predetermined number of blocks are assigned to each of the non-compressed program area, the compressed program area and the received and compressed program area.

Figure 6B:
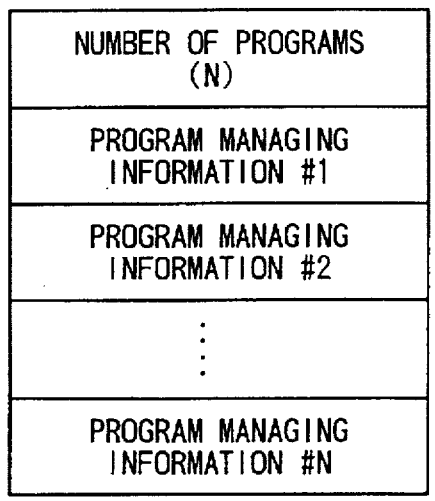
FIG. 6B is an illustration for explaining a received program managing table.
Figure 6C:
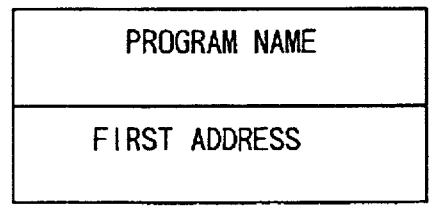
FIG. 6C is an illustration for explaining contents of program managing information.

The patch program received from the service center is in the form of the compressed program data. A plurality of patch programs are stored in the received and compressed program area. Information of a received program managing table shown in FIG. 6B is generated and stored in the SRAM 4 so that the plurality of received and compressed programs stored in the received and compressed program area can be accessed. This received program managing table includes information regarding a number of programs stored in the received and compressed program area and program managing information. The program managing information includes a name of the corresponding program stored in the received and compressed program area and the first address of the corresponding program data in the received and compressed program area as shown in FIG. 6C.

Figure 7:
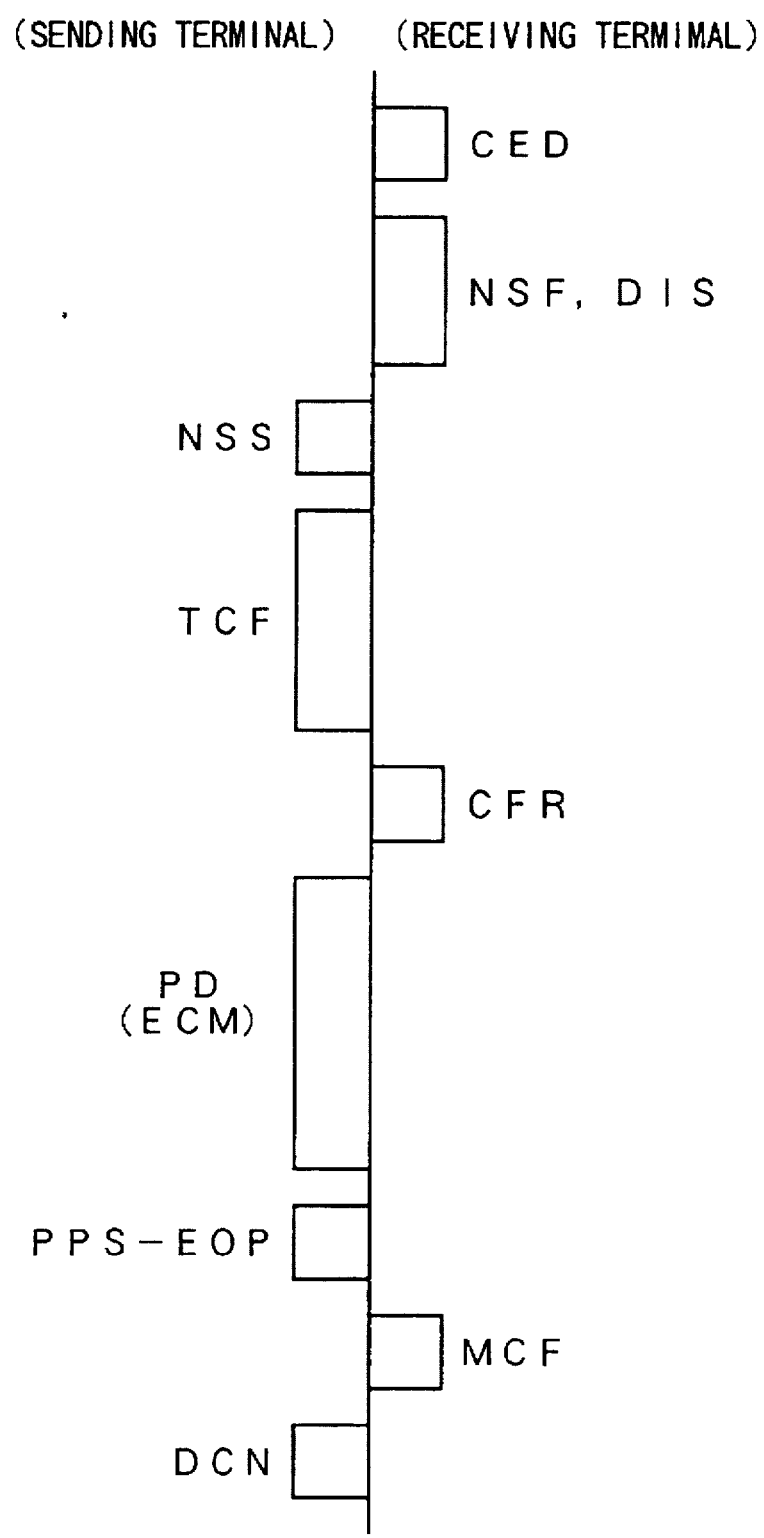
FIG. 7 is an illustration for explaining a procedure performed when a patch program is sent from a service center.

FIG. 7 is an illustration for explaining a procedure performed when the patch program is sent from the service center.

When the service center (sending terminal) calls the facsimile apparatus (receiving terminal) and the receiving terminal receives the call, the receiving terminal sends to the sending terminal a Called Station Identification signal CED, a Non-Standard Facilities signal NSF and a digital Identification Signal DIS.

The sending terminal determines a transmission function to be used based on the contents of the received NSF and DIS and a function available in the sending terminal. In this case, a binary file transfer function of the group 3 facsimile function is included in the transmission function to be used so that the compressed program data of the patch program can be transmitted.

The sending terminal then sends to the receiving terminal a Non-Standard facilities Set-up signal NSS to notify the receiving terminal of the use of the transmission function determined by the sending terminal. The sending terminal also sends a Training Check signal TCF at a transmission rate set at this time. The receiving terminal sets therein the transmission function notified by the NSS, and receives the TCF. If the TCF is received in good condition, the receiving terminal sends a Confirmation to Receive signal CFR to the sending terminal.

After receiving the CFR, the sending terminal performs a predetermined ECM mode procedure to send the compressed program data PD of the patch program. When the sending of the PD is completed, the receiving terminal sends to the sending terminal a Part Page End of Message signal PPS-EOP. When receiving the compressed program data PD, the receiving terminal temporarily stores the received data in the ECM buffer 12. Additionally, when receiving the PPS-EOP, the receiving terminal sends a response signal which represents a result of the reception. In this case, since the result of the reception is good, a Message Confirmation signal MCF is sent to the sending terminal. After receiving the MCF, the sending terminal sends a Disconnect signal DCN to reset the line and complete the series of transmitting operations.

After receiving the DCN, the receiving terminal resets the line and completes the series of receiving operations. Then, the receiving terminal stores the compressed program data PD, which is temporarily stored in the ECM buffer 12, in the received and compressed program area of the FLROM 2. At this time, the above-mentioned program managing information is produced. The produced program managing information is added to the received program managing table, and thus the number of programs in the table is increased.

Figure 8:
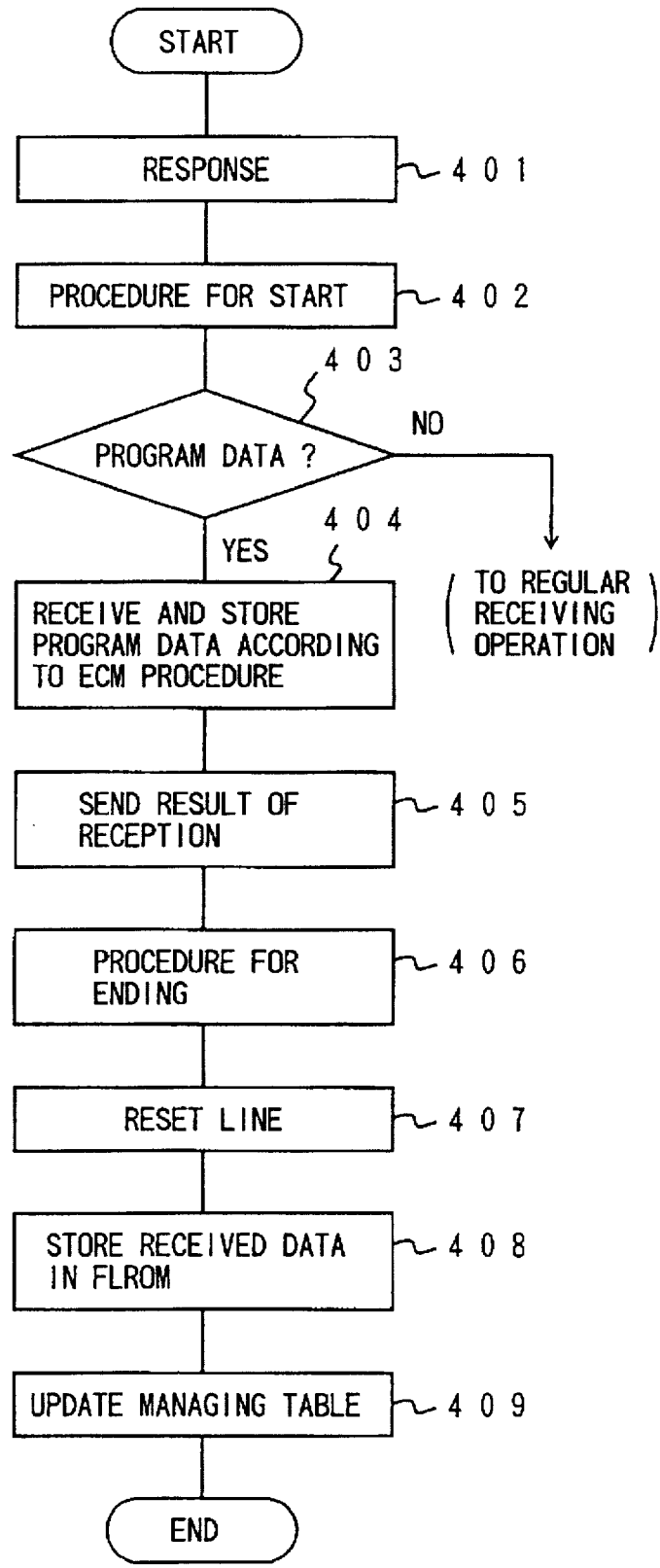
FIG. 8 is a flowchart of an operation performed by the facsimile apparatus for receiving a patch program.

FIG. 8 is a flowchart of an operation performed by the facsimile apparatus for receiving the patch program.

When the facsimile apparatus is called, the facsimile apparatus responds to the calling terminal in S401, and perform a predetermined communication procedure in S402. Then, it is determined, in S403, whether or not the binary transmission function is assigned. If the determination in S403 is negative, the facsimile apparatus enters a regular receiving operation. If the determination in S403 is affirmative, the facsimile apparatus receives, in S404, the program data in accordance with the predetermined ECM procedure, and stores the program data in the ECM buffer 12. When the reception of the program data is completed, the facsimile apparatus sends a result of reception in S405, and then performs, in S406, a predetermined procedure to end the reception and reset, in S407, the line.

The facsimile apparatus stores, in S408, the program data PD, which was received at this time and stored in the ECM buffer 12, in the received and compressed program area of the FLROM 2. Then, the program managing information is produced with respect to the received program data PD so as to update, in S409, the received program managing table. That is, the produced program managing information is added to the received program managing table, and thus the number of programs in the table is increased.

Figure 9:
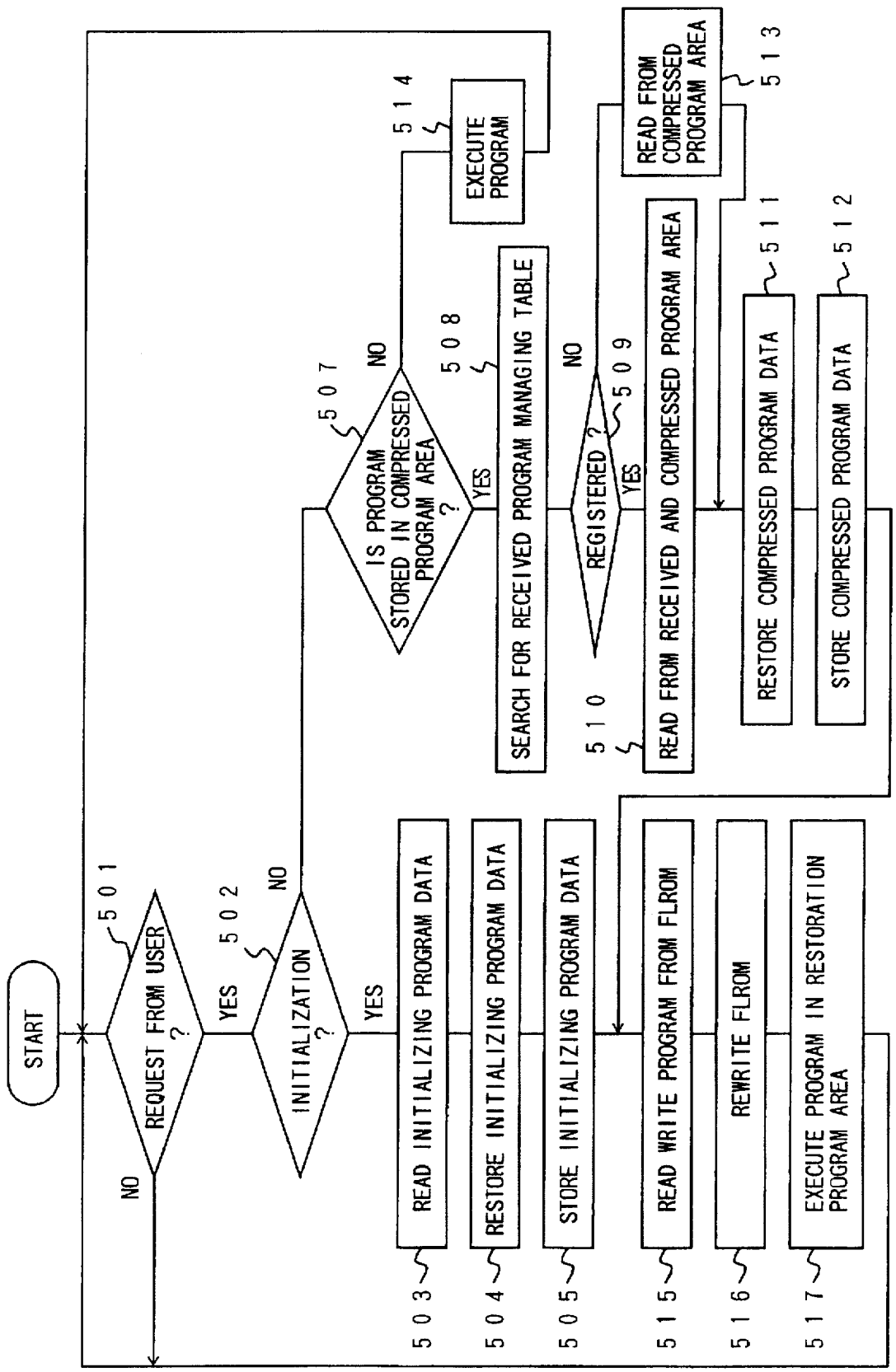
FIG. 9 is a flow chart of an operation performed in the second embodiment according to the present invention.

In the second embodiment, when the initializing operation or other service functions are requested by a user, an operation shown in FIG. 9 is performed. FIG. 9 is a flow chart of the operation performed in the second embodiment.

When the operation is started, the CPU 1 determines, in step 501, whether or not a request for the service functions is made by a user. If it is determined that a request is made, it is determined, in S502, whether or not the request is for the initializing function.

If the determination in S502 is affirmative, the compressed program data corresponding to an initialization program is read out, in S503, from the compressed program area of the FLROM 2. Then, the compressed program data is restored, in S504, to an original form which is the direct execute program data by a predetermined restoring method. The restored program data is then stored, in S505, in the restoration program area of the DRAM 3.

After the restored program data is stored in the restoration program area of the DRAM 3, compressed program data corresponding to a write program used for writing the FLROM 2 is read out, in S515, from the FLROM 2 and restored to an original form. Then, a rewriting operation is performed to the FLROM 2, in S516, in accordance with the restored write program.

The CPU 1 executes, in S517, the program corresponding to the restored program data in the restoration program area, and then the routine returns to S501.

On the other hand, if it is determined, in S502, that the request is not for the initialization, the routine proceeds to S507. In S507, it is determined whether or not the request is related to one of the service functions of which program data are stored in the compressed program area of the FLROM 2.

If the determination in S507 is affirmative, the routine proceeds to S508 in which the received program managing table is searched. Then, it is determined, in S509, whether or not the program corresponding to the service function requested by the user has been stored in the received and compressed program area of the FLROM 2. If the determination in S509 is affirmative, the corresponding compressed program data (patch program data) is read out, in S510, from the received and compressed program area FLROM 2, and stored in the work area of the DRAM 3. The program data in the work area is then restored, in S511, to the original form, and the restored program data (direct execute program data) is sequentially stored, in S512, in the restoration program area of the DRAM 3 starting from the first address.

After the direct execute program data is stored in the restoration program area in the above-mentioned manner, the routine proceeds to S515 so as to rewrite the FLROM 2 and to execute the operation in accordance with the direct execute program data stored in the restoration program area.

If the determination in S509 is negative, the program data corresponding to the service function requested by the user is read out, in S513, from the compressed program area of the FLROM 2, and is stored in the work area of the DRAM 3. Thereafter, the routine follows S511, S512, S515, S516 and S517 so as to execute the operation requested by the user in accordance with the direct execute program data stored in the restoration program area of the DRAM 3.

If the determination in S507 is negative, the requested service function of which program data is stored in the non-compressed program area is read, and the program corresponding to the program data is executed without restoring the program data since the program data is not compressed.

As mentioned above, in the present embodiment, when a malfunctioning occurs in the group 3 facsimile apparatus, the patch program is transmitted from the service center. The patch program is stored in the FLROM 2, and is used to tentatively operate the facsimile apparatus if the malfunctioning can be avoided by using the patch program. Accordingly, the group 3 facsimile apparatus can be operated, maybe with limited functions, until a maintenance person arrives and finally fix the facsimile apparatus.

In the above-mentioned embodiment, the program data received from the service center is not limited to the patch program. For example, program data for the a group 3 facsimile communication function stored in the non-compressed program area of the FLROM 2 may be rewritten by a new version by receiving the new version. In this way, a customization of the facsimile apparatus is easily performed. Similarly, the contents of the compressed program area and the parameter data area may be rewritten. When the contents of the parameter data area is rewritten, the contents of the SRAM 4 should be rewritten at the same time. This enables a registration of shortened dial numbers from a remote location.

It should be noted that although the group 3 facsimile apparatus is used in the embodiments of the present invention, the present invention may be applied to a group 4 facsimile apparatus.

The present invention is not limited to the specifically disclosed embodiments, and variations and modifications may be made without departing from the scope of the present invention.

What is claimed is:

1. A facsimile apparatus having maintenance programs stored therein and used for maintenance service functions, one of the maintenance programs being selected according to a request made by a user so as to perform a maintenance service function in accordance with the selected maintenance program, the facsimile apparatus comprising:

selecting means for selecting one of the maintenance programs corresponding to a maintenance service function requested by the user;

storing means divided into a plurality of separately rewritable data blocks and comprising, a non-compressed program area for storing non-compressed program data, a compressed program area for storing compressed program data corresponding to at least one of the maintenance programs, and a parameter data area storing parameter data used in the maintenance service functions;

reading means for reading compressed program data corresponding to the selected maintenance program from said storing means;

restoring means for restoring the selected maintenance program from the compressed program data read by said reading means;

executing means for executing the restored maintenance program; and memory means for storing the parameter data stored in the parameter data area of said storing means;

wherein said parameter data area of said storing means is overwritten, when the parameter data stored in said memory means is updated, by the updated parameter data and, said memory means is overwritten, when the facsimile apparatus is turned on, by the parameter data stored in said parameter data area of said storing means.

2. The facsimile apparatus as claimed in claim 1, wherein said memory means is a static random access memory.

3. A facsimile apparatus having maintenance programs stored therein and used for maintenance service functions, one of the maintenance programs being selected according to a request made by a user so as to perform a maintenance service function in accordance with the selected maintenance program, the facsimile apparatus comprising:

selecting means for selecting one of the maintenance programs corresponding to a maintenance service function requested by the user;

storing means for storing program data as one of non-compressed program data and compressed program data, the compressed program data corresponding to at least one of the maintenance programs;

reading means for reading compressed program data corresponding to the selected maintenance program from said storing means;

restoring means for restoring the selected maintenance program from the compressed program data read by said reading means; and executing means for executing the restored maintenance program;

wherein said storing means further comprises a received and compressed data area which stores the compressed program data corresponding to said at least one of the maintenance programs, the compressed program data being received from a remote apparatus via a facsimile communication line, said reading means reads the compressed program data corresponding to the selected one of the maintenance programs from said received and compressed program area of said storing means.

4. A facsimile apparatus having maintenance programs stored therein and used for maintenance service functions, one of the maintenance programs being selected according to a request made by a user so as to perform a maintenance service function in accordance with the selected maintenance program, the facsimile apparatus comprising:

selecting means for selecting one of the maintenance programs corresponding to a maintenance service function requested by the user;

storing means for storing program data as one of non-compressed program data and compressed program data, the compressed program data corresponding to at least one of the maintenance programs;

reading means for reading compressed program data corresponding to the selected maintenance program from said storing means;

restoring means for restoring the selected maintenance program from the compressed program data read by said reading means; and executing means for executing the restored maintenance program;

wherein said storing means further comprises a received program area which stores the program data corresponding to the maintenance programs, the program data being received from a remote apparatus via a facsimile communication line, and said executing means executes the maintenance program stored in said received data area when the maintenance program received and stored in the received program area is selected by said selecting means.

* * * * *

UNITED STATES PATENT AND TRADEMARK OFFICE
CERTIFICATE OF CORRECTION

PATENT NO. : 5,640,248
DATED : June 17, 1997
INVENTOR(S) : Masashi HIROKAWA

It is certified that error appears in the above-indentified patent and that said Letters Patent is hereby corrected as shown below:

On the title page, item [30], the Foreign Application Priority Data should be:

[30]

--Sep. 30, 1994 [JP] Japan .............. 6-259731--

Signed and Sealed this

Ninth Day of September, 1997

Attest:

BRUCE LEHMAN

Attesting Officer     Commissioner of Patents and Trademarks